United States Patent [19]

Takahashi

[11] Patent Number: 5,041,773
[45] Date of Patent: Aug. 20, 1991

[54] DRIVE CIRCUIT FOR STEPPING MOTOR

[75] Inventor: Shoji Takahashi, Saitama, Japan

[73] Assignee: Citiaen Watch Co., Ltd., Tokyo, Japan

[21] Appl. No.: 510,434

[22] Filed: Apr. 18, 1990

[30] Foreign Application Priority Data

Apr. 26, 1989 [JP] Japan .................. 1-107977

[51] Int. Cl.$^5$ ............................................ H02P 8/00
[52] U.S. Cl. ............................ 318/696; 318/685;
318/254; 323/315; 307/296.1; 360/77.08
[58] Field of Search ............... 318/696, 685, 254;
323/349, 315; 307/296.1; 360/77.08; 363/131, 132

[56] References Cited

U.S. PATENT DOCUMENTS

| | | | |
|---|---|---|---|
| 4,057,743 | 11/1977 | Limberg | 307/296.1 |
| 4,140,960 | 2/1979 | Ohsawa | 323/349 |
| 4,338,551 | 7/1982 | Mizumoto | 318/254 |
| 4,358,720 | 11/1982 | Abe | 318/254 |
| 4,651,269 | 3/1987 | Matsumura | 363/132 X |
| 4,961,046 | 10/1990 | De Jager | 323/315 |

OTHER PUBLICATIONS

C. J. Savant et al., "Electronic Circuit Design", Benjamin/Cummings Publishing Company, Inc., 1987; pp. 303-304.

Primary Examiner—William M. Shoop, Jr.
Assistant Examiner—Saul M. Bergmann
Attorney, Agent, or Firm—Koda and Androlia

[57] ABSTRACT

A drive circuit for a stepping motor which seeks the read/write head of an FDD or the like to a predetermined track. The drive circuit includes a plurality of exciting coils for providing exciting fields to a rotor and supplies exciting currents in the forward or reverse direction by a predetermined combination to each of the exciting coils. A constant-current circuit is provided so as to cause the exciting current flowing on each exciting coil to have a constant value. The constant-current circuit includes a current mirror circuit with the slave branch connected to the exciting coils and the master branch contained in the constant-current circuit. The constant-current circuit further includes a constant-current source for supplying a constant current to the master branch of the current mirror circuit and a constant-current setting circuit for setting the constant current as desired.

By making the currents flowing on the exciting coils uniform, the seeking positional accuracy of the read/write head is improved.

6 Claims, 8 Drawing Sheets

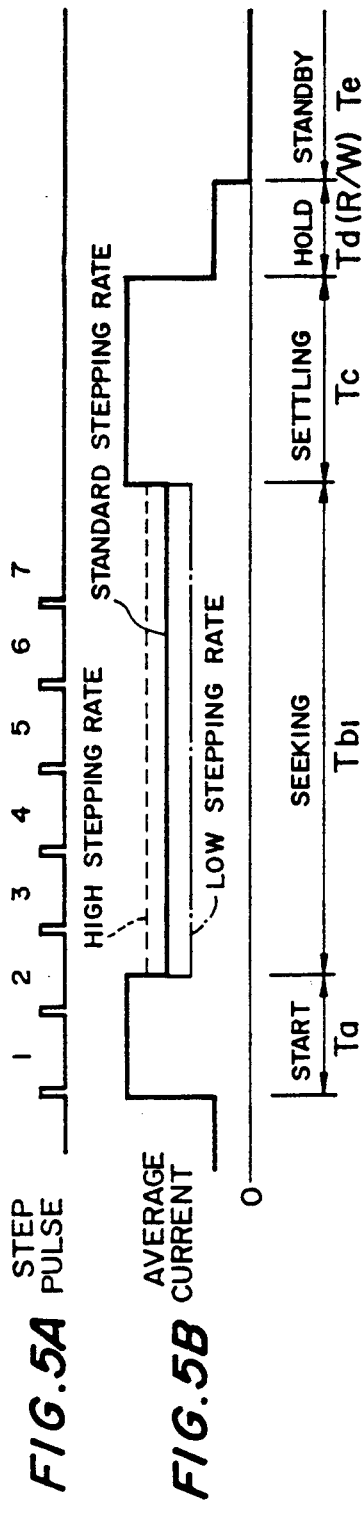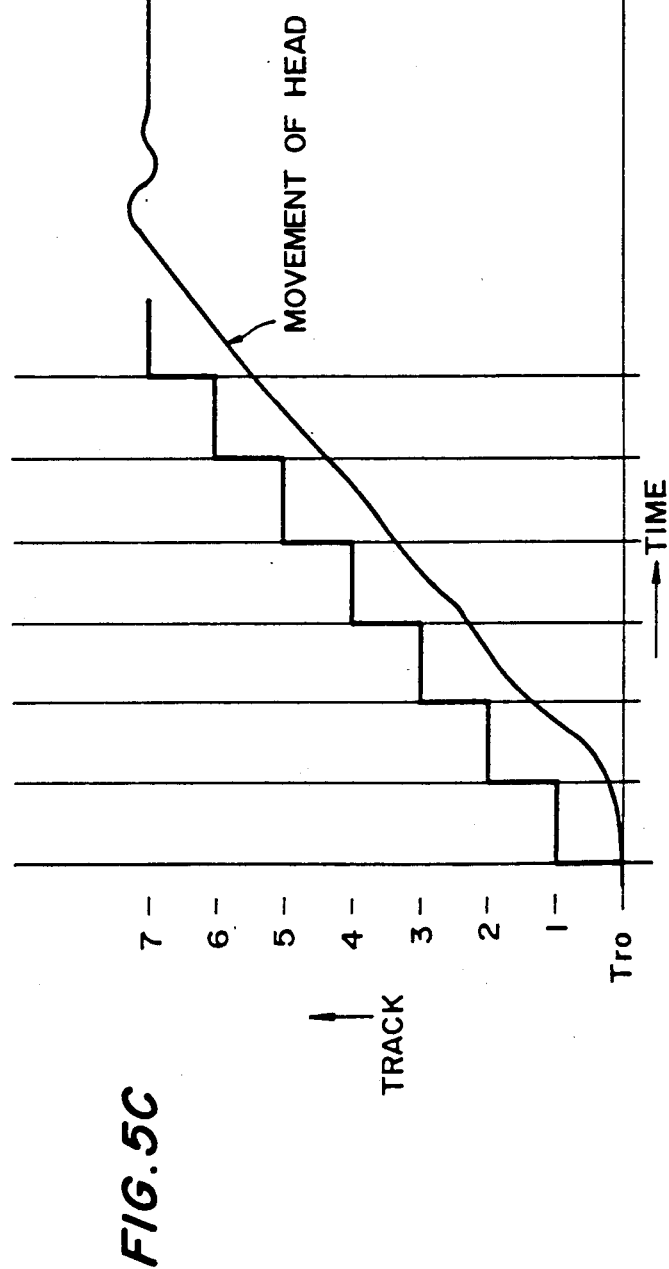

DRIVE CIRCUIT FOR STEPPING MOTOR

BACKGROUND OF THE INVENTION

1. Field of the Invention

The present invention relates to a drive circuit for a stepping motor and, more particularly, to a drive circuit for a stepping motor which is capable of setting the exciting current to be supplied to each exciting coil at the optimum value.

2. Description of the Related Art

A stepping motor has hitherto been used in equipments such as a floppy disk drive (hereinunder referred to as "FDD") so as to obtain a necessary rotational angle. More specifically, in order to write or read necessary data by the access to a given track on a floppy disk, for example, it is necessary to position the head for reading and writing in such a manner as to be settled to the predetermined track on the disk. At this time, the position of the predetermined track on the disk can be represented by the rotational angle of the stepping motor with respect to the reference position thereof. In order to position the head at a given rotational position of the stepping motor, a stepping motor having a necessary stepping angle is used.

A stepping motor is composed of a rotor which rotates by the angle corresponding to the number of supplied pulses, and a plurality of exciting coils for generating excitation fields which act on the rotor. The stepping motor is driven by a drive circuit including a drive control circuit which supplies exciting currents to the exciting coils in correspondence with the pulse signals input from the outer host computer. To the drive circuit of the stepping motor, a pulse signal is input from the outside of the motor and the circuit supplies a predetermined exciting current to the exciting coils. The rotor is rotated by the excitation fields generated on the exciting coils in correspondence with the exciting currents. At this time, an exciting current is supplied to each exciting coil so that a predetermined rotational angle (hereinunder referred to as "stepping angle") is provided for the rotor every time one pulse signal is input to the drive circuit.

An example of the structure of such a drive circuit of a stepping motor is shown in FIG. 7. FIG. 7 shows the entire structure of a drive circuit for what is called four-phase two-coil type stepping motor. A drive circuit 10 is composed of a first exciting coil 14 and a second exciting coil for supplying magnetic excitation fields to a rotor 12, and a first drive control circuit 18 and a second drive control circuit 20 for supplying exciting currents $I_1$ and $I_2$ to the coils 14 and 16, respectively, in accordance with the pulse signals input from the outer host computer.

To the first and second drive control circuits 18 and 20, the exciting currents $I_1$ and $I_2$ are respectively supplied so that the rotor 12 rotates by a predetermined stepping angle every time one pulse signal is input from the outer host computer.

FIG. 8 is a circuit diagram of the first drive control circuit 18. Since the second drive control circuit 20 has a similar structure to that of the first drive control circuit 18, explanation of the structure of the second drive control circuit 20 will be omitted.

The first drive control circuit 18 is connected to both ends of the first exciting coil 14 and includes switching circuit 24 124 for outputting switching signal in accordance with the pulse signal input from the outer host computer and transistors 126, 28 and 128 to which a driving voltage $V_{cc}$ is applied from the outer host computer and which are turned on/off in accordance with an ON/OFF signal supplied from the switching circuit 24 124.

In the drive control circuit 18, an ON signal is output from either of the switching circuits 24 and 124, and an OFF signal is output from the other switching circuit. When an ON signal is output from the switching circuit 24 and an OFF signal is output from the switching circuit 124, the transistors 26 and 28 are turned on and the transistors 126 and 128 are turned off. An exciting current $I_{1a}$ flows on the exciting coil 14 by the application of the driving voltage $V_{cc}$. Reversely, when an OFF signal is output from the switching circuit 24 and an ON signal is output from the switching circuit 124, the reverse exciting current $I_{1b}$ flows on the exciting coil 14. In this way, according to the drive control circuit 18, it is possible to supply the exciting currents $I_{1a}$ and $I_{1b}$ to the exciting coil 14.

FIG. 9 shows the operation of a stepping motor using the drive circuit 10 having the structure shown in FIGS. 7 and 8.

FIG. 9(a) shows a stepping motor in which exciting currents $I_1$ and $I_2$ flow on the exciting coils 14 and 16, respectively, so that the rotor 12 rotates clockwise. If the stepping angle $\theta_s$ is set at 45°, the angular displacement $\theta$ from the reference radius upwardly extending from the center of the rotor 12 takes eight different values during one revolution of the rotor 12. FIG. 9(b) shows the relationship between the exciting currents $I_1$, $I_2$, the angular displacement $\theta$ and the stepping angle $\theta_s$, and the number of pulse signals supplied from the outer host computer to the drive circuit 10.

When a pulse signal is input from the outer host computer in the state in which the angular displacement $\theta$ is 0, the exciting currents $I_1$, $I_2$ flowing on the exciting coils 14 and 16 take predetermined values of $I_{1a}$ and $I_{2b}$, respectively. The predetermined value $I_{1a}$ is the value of an exciting current which is supplied to the exciting coil 14 when the transistors 26 and 28 are turned on in the first drive control circuit 18 shown in FIG. 8. The other predetermined value $I_{2b}$ is also the value of an exciting current which is similarly supplied to the exciting coil 16 in the second drive control circuit 20 having the same structure as the first drive control circuit 18. The rotor 12 is rotated clockwise by the stepping angle $\theta_s$ by the exciting fields generated on the exciting coils 14 and 16 in accordance with the exciting currents $I_1$ and $I_2$.

When another pulse signal is input from the outer host computer, the exciting currents $I_1$ and $I_2$ take the value of $\theta$ and the predetermined value $I_{2b}$, respectively and the rotor 12 further rotates by the stepping angle $\theta_s$.

When still another pulse signal is input from the outer host computer, the exciting currents $I_1$ and $I_2$ take the respective predetermined values $I_{1b}$ and $I_{2b}$, and the rotor 12 further rotates by the stepping angle $\theta_s$.

The predetermined value $I_{1b}$ is the value of an exciting current which is supplied to the exciting coil 14 when the transistors 126 and 128 are turned on in the first drive control circuit 18. The exciting current $I_{1b}$ is a current flowing in the reverse direction to the exciting current $I_{1a}$.

According to the drive circuit 10, it is possible to obtain a stepping motor which is capable of outputting the rotational angle by the unit of the stepping angle $\theta_s$, if necessary, by displacing the rotational angle of the rotor 12 by the unit of the stepping angle $\theta_S$ in accordance with the pulse signal which is input from the outer host computer in series.

However, the drive circuit for a conventional stepping motor having the above-described structure is disadvantageous in that nonuniformity in the resistances of the exciting coils or the like produces nonuniformity in the exciting currents supplied to the respective exciting coils, thereby producing an error in the stepping angle. For example, when the exciting currents have the following relationship due to nonuniformity, as shown in FIG. 9(b):

$$I_{1a} < I_{2b}, I_{1b} < I_{2a}$$

the nonuniformity in the exciting current produces a nonuniformity in the excitation fields and, hence, a nonuniformity in the attractions or repulsions. The stepping angle $\theta_S$ does not therefore agree with the desired stepping angle $\theta_{S0}$ (45° in FIG. 9(b)) and takes a value $\theta_{S0} + \delta_1$ or $\theta_{S0} - \delta_2$ which contains a stepping angle error $\delta_1$ or $\delta_2$ caused by the nonuniformity in the exciting currents. Such a drive circuit for a stepping motor causes a malfunction or defective operation of the equipment such as an error in writing or reading in equipments such as an FDD.

SUMMARY OF THE INVENTION

Accordingly, it is an object of the present invention to eliminate the above-described problems in the related art and to provide a drive circuit for a stepping motor which prevents the generation of nonuniformity in the exciting currents which are supplied to the exciting coils and the generation of an error due to the nonuniformity in the exciting currents, thereby obtaining the stepping angle with improved accuracy.

To achieve this aim, a drive circuit according to the present invention is characterized in that a constant-current circuit is provided for so controlling the currents supplied to the exciting coils as to have a constant value and set the exciting currents flowing on the respective exciting coils at the same value, thereby improving the accuracy of the stepping angle.

According to the present invention, the exciting currents flowing on the respective exciting coils are so controlled as to have the same value by the constant-current circuit. Therefore, the exciting fields generated on the exciting coils by the exciting currents become the same. In this way, the generation of an error in the stepping angle of the rotating rotor is prevented and the stepping angle is obtained with improved accuracy.

The above and other objects, features and advantages of the present invention will become clear from the following description of the preferred embodiments thereof, taken in conjunction with the accompanying drawings.

BRIEF DESCRIPTION OF THE DRAWINGS

FIGS. 3(a) and 3(b) are explanatory views of the operation of the first embodiment shown in FIG. 1, wherein FIG. 3(a) shows the angular displacement thereof, and FIG. 3(b) shows the pulsating operation thereof;

FIG. 5 shows the timing chart for the switching operation of the constant-current circuit shown in FIG. 4 and the movement of the head;

FIGS. 9(a) and 9(b) are explanatory views of the operation of the conventional drive circuit shown in FIG. 7, wherein FIG. 9(a) shows the angular displacement thereof, and FIG. 9(b) shows the pulsating operation thereof.

DESCRIPTION OF THE PREFERRED EMBODIMENTS

Figure 7:
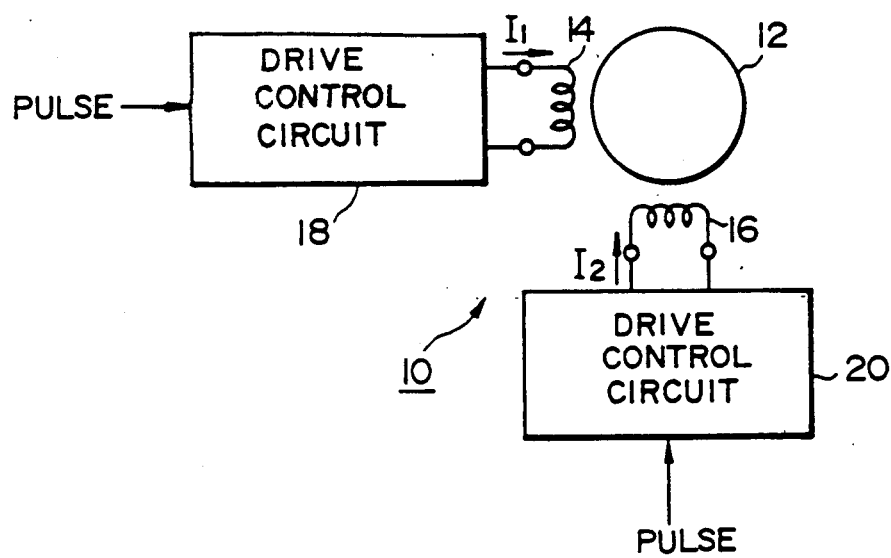
FIG. 7 shows the entire structure of a conventional drive circuit for a stepping motor.
Figure 8:
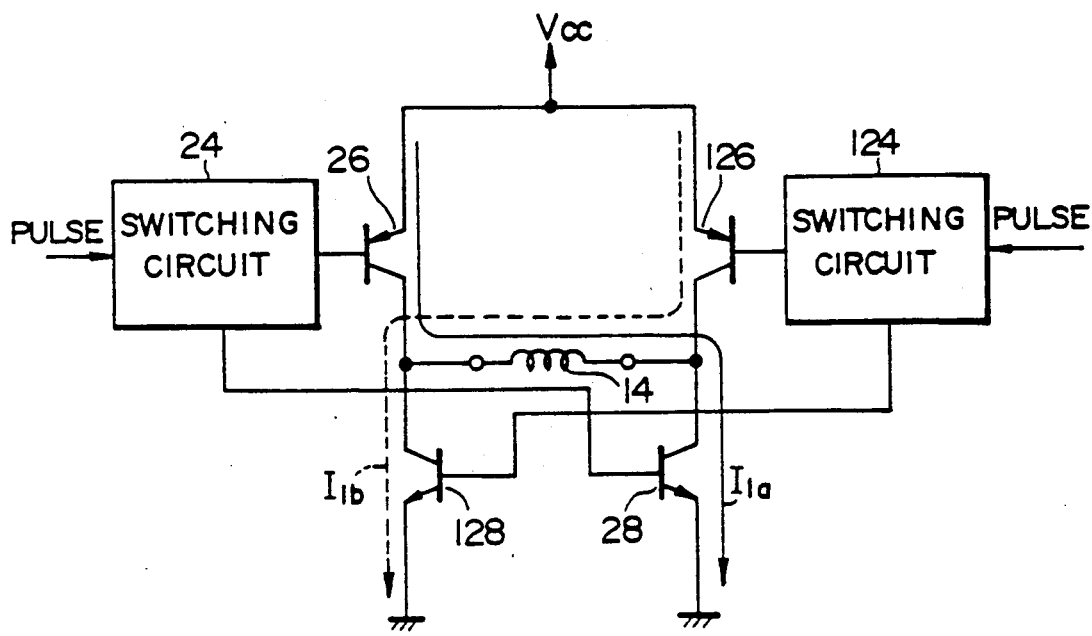
FIG. 8 is a circuit diagram of the conventional drive circuit shown in FIG. 7.
Figure 9A:
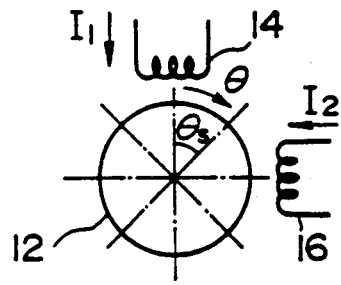
Figure 9B:
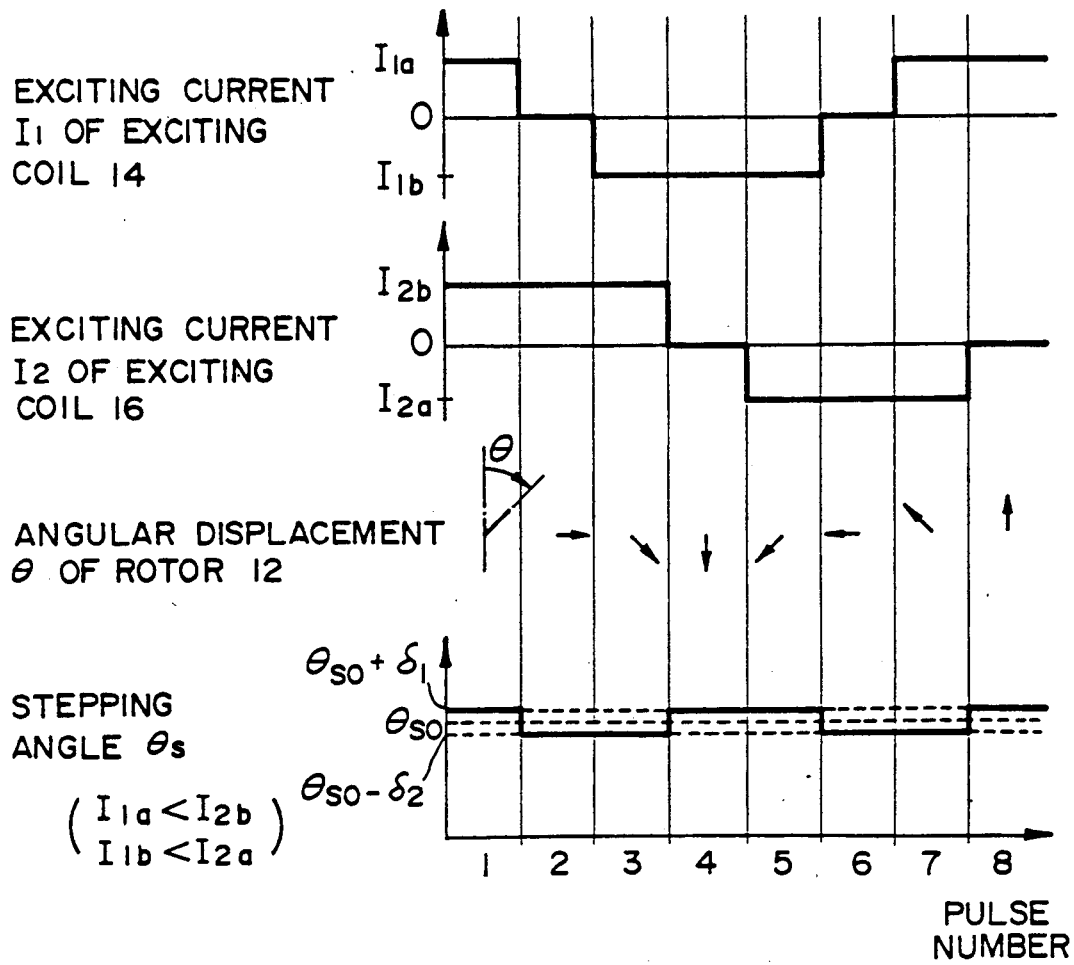

Preferred embodiments of a drive circuit for a stepping motor according to the present invention will be explained hereinunder with reference to the accompanying drawings. The same numerals are provided for the elements which are the same as those in the conventional drive circuit shown in FIGS. 7 and 8, and explanation thereof will be omitted.

Figure 1:
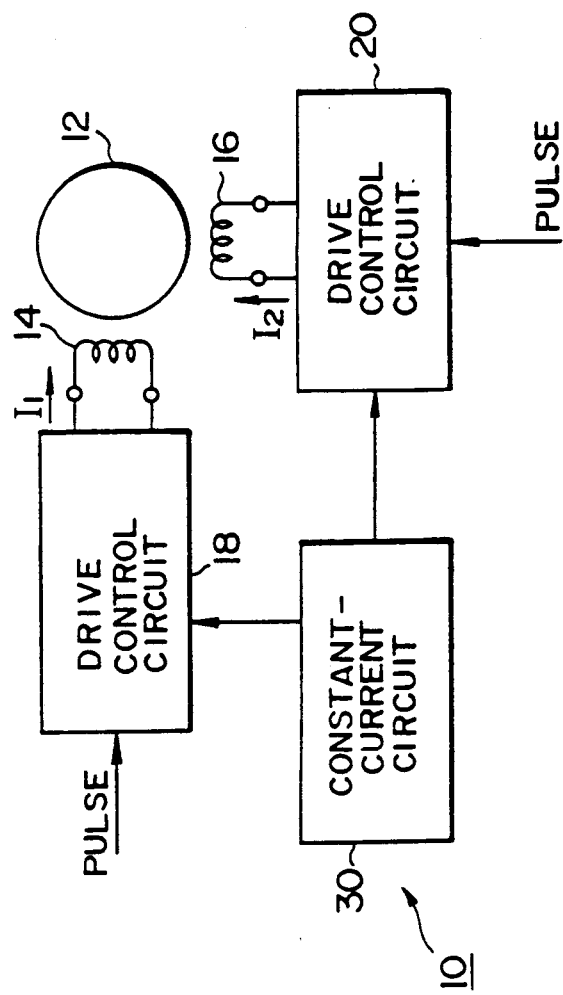
FIG. 1 shows the entire structure of a first embodiment of a drive circuit for a stepping motor according to the present invention.

FIG. 1 shows the entire structure of a first embodiment of a drive circuit for a four-phase two-coil stepping motor according to the present invention. In FIG. 1, the first and second drive control circuits 18 and 20 for supplying exciting currents to the first and second exciting coils 14 and 16 supply a constant current $i_O$ to the respective exciting coils 14, 16 under the control of a constant-current circuit 30, which characterizes the present invention.

Figure 2:
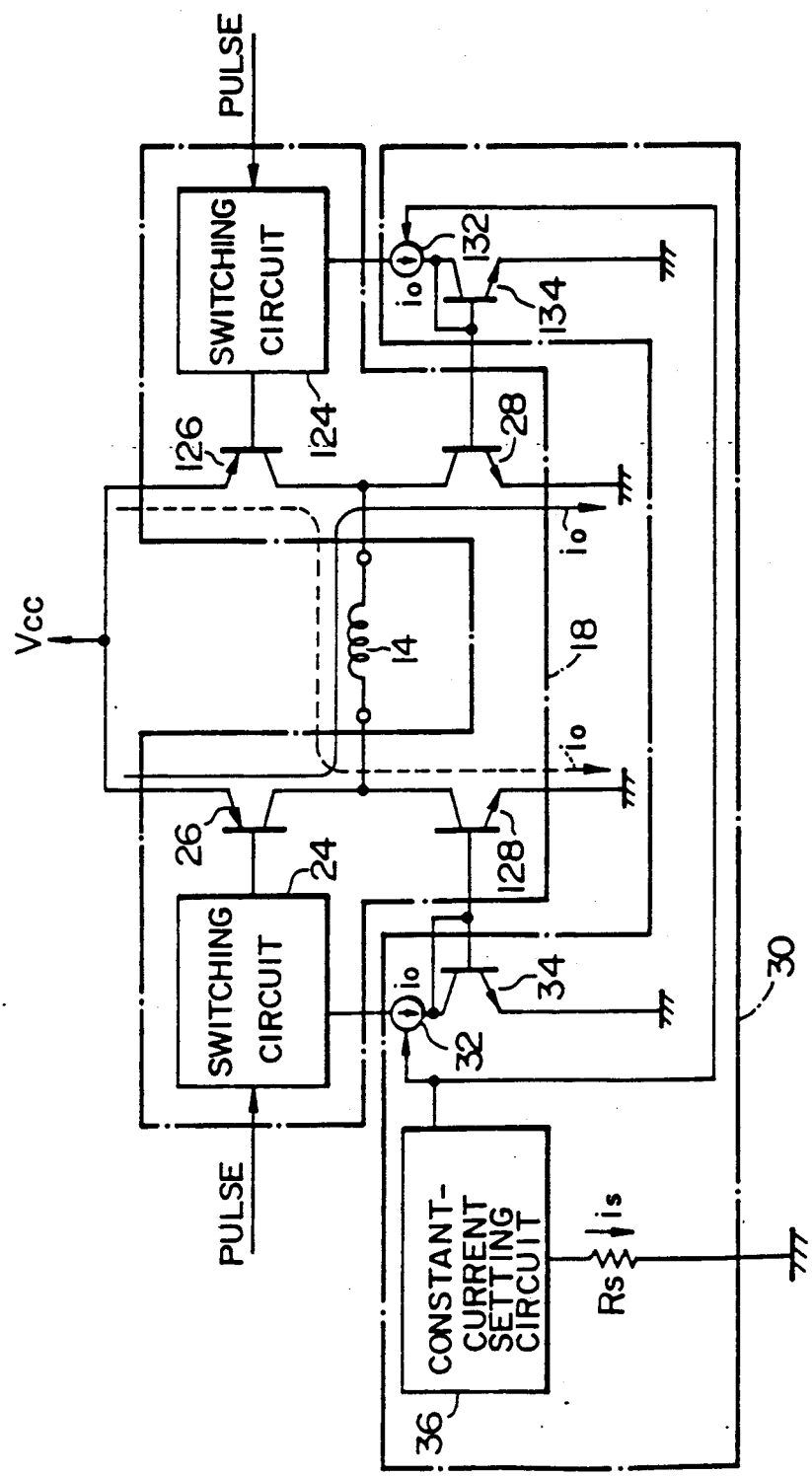
FIG. 2 is a circuit diagram of the first embodiment shown in FIG. 1.

In this embodiment, the first drive control circuit 18 and the constant-current circuit 30, which characterizes the present invention, have the structure shown in FIG. 2.

In FIG. 2, the constant-current circuit 30 is composed of constant-current sources 32 and 132 which are connected respectively to the switching circuits 24 and 124 from which an ON/OFF signal having an inverse value to the ON/OFF signal supplied respectively to the transistors 26 and 126 which are supplied respectively so that the current output is turned OFF/ON, transistors 34 and 134 which are connected respectively to the constant-current sources 32 and 132 and the bases of which are connected respectively to the basis of the transistors 128 and 28 so as to constitute current mirror circuits with a constant-current setting circuit 36 for setting respectively the output current $i_O$ of the constant-current sources 32 and 132, and a monitor resistance $R_S$ which relates to the setting of the output current $i_O$. In particular, the elements 32, 34 and 128 constitute a first current mirror circuit; while elements 132, 134 and 28 constitute a second current mirror circuit.

In FIG. 2, the constant current $i_O$ of the constant-current sources 32 and 132 are set by the constant-current setting circuit 36 so that the current $i_S$ which flows to the monitor resistance $R_S$ and $i_O$ are proportional to each other. The constant current $i_O$ is supplied respectively to the transistors 34 and 134 and the first and second current mirror circuits constituted respectively by the elements 32, 34 and 128 and 132, 134 and 28 cause the current which flows respectively to the transistors 128 and 28 to have.

According to the constant-current circuit 30 having the above-described structure, the exciting current $I_1$ supplied to the exciting coil 14 through the transistor 26 and the exciting current $I_1$ supplied to the exciting coil 14 through the transistor 126 have the same absolute value. More specifically, when the transistor 26 is turned on in accordance with the ON signal from the switching circuit 24, the current output of the constant-current source 32 is turned off, the transistor 126 is turned off in accordance with the OFF signal from the switching circuit 124 and the current output of the constant-current source 132 is turned on, the transistors 26 and 28 are turned on and the exciting current $I_1$ supplied to the exciting coil 14 takes the same value as the current flowing to the transistor 134, namely, the constant current $i_O$ due to the current mirror circuit constituted by the transistors 28 and 134. Reversely, when the transistor 126 is turned on in accordance with the ON signal from the switching circuit 124, the current output of the constant-current source 132 is turned off, the transistor 26 is turned off in accordance with the OFF signal from the switching circuit 24 and the current output of the constant-current source 32 is turned on, the transistors 126 and 128 are turned on and the exciting current $I_1$ supplied to the exciting coil 14 takes the same value as the current flowing to the transistor 34, namely, the constant current $i_O$ due to the current mirror circuit constituted by the transistors 128 and 34.

As shown in FIG. 1, since the constant-current circuit 30 is connected to the second drive control circuit 20 in the same manner as to the first drive control circuit 18, the exciting current $I_2$ flowing on the second exciting coil 16 has the same value as the constant current $i_O$ in the same way as the exciting current $I_1$ flowing on the first exciting coil 14.

Figure 3A:
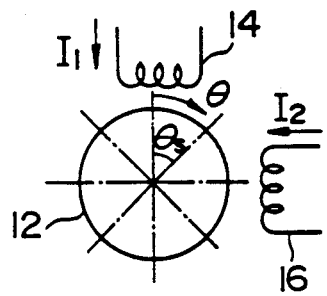
Figure 3B:
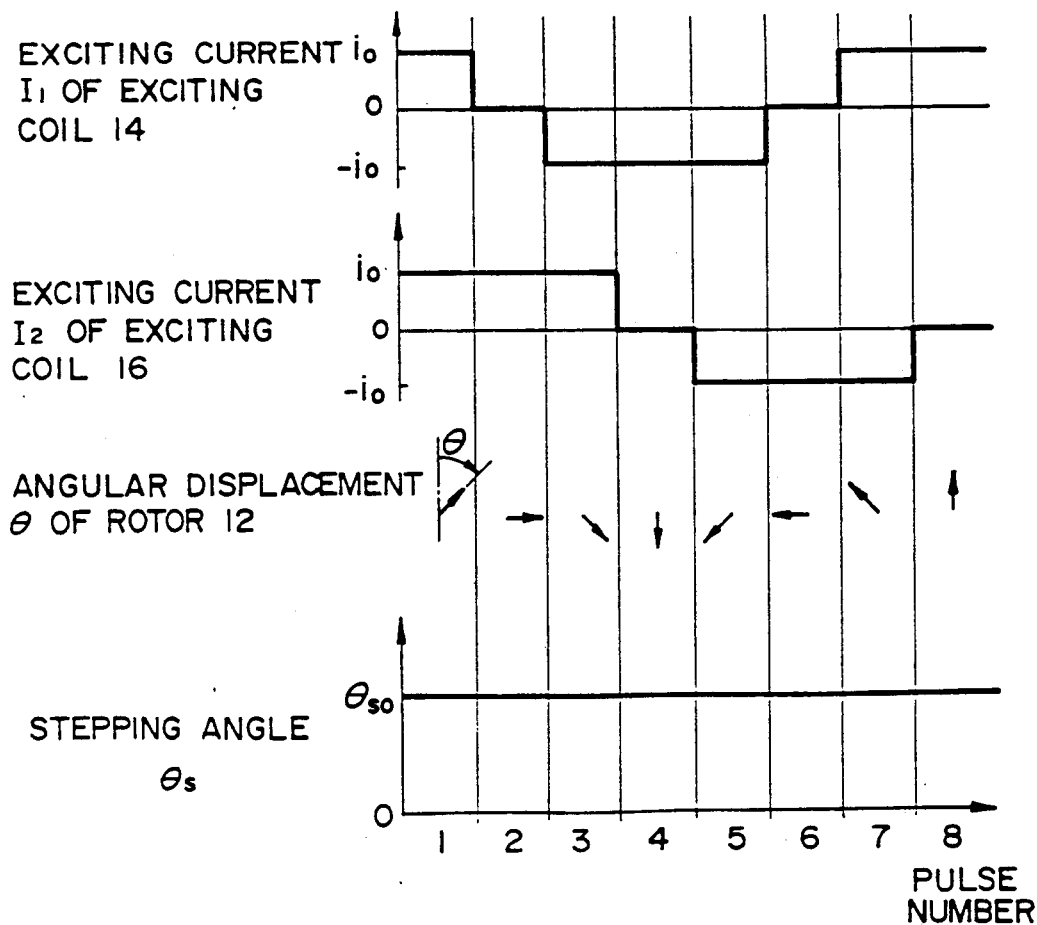

The operation of the drive circuit 10 of this embodiment is shown in FIG. 3.

In this embodiment, the stepping angle $\theta_S$ agrees with the desired value $\theta_{S0}$ (45° in FIG. 3). Since the exciting currents $I_1$ and $I_2$ supplied to the exciting coils 14 and 16 are bidirectional currents having the same value as the constant current $i_O$ by virtue of the constant-current circuit 30, the exciting fields generated on the exciting coils 14 and 16 by the exciting currents $I_1$ and $I_2$ having the same value also have the same value. The gravities and the repulsions caused by the exciting coils 14 and 16 also have the same value, whereby the angular displacement $\theta$ is produced on the rotor 12 by the unit of a desired stepping angle $\theta_{S0}$.

Therefore, according to the drive circuit 10 of this embodiment, since the exciting currents are caused to have the same value by the constant-current circuit 30, no error caused by the nonuniformity in the exciting currents is contained in the stepping angle $\theta_S$, whereby it is possible to control the rotation of the rotor 12 and achieve the improvement of the accuracy of the stepping angle of the stepping motor.

Figure 4:
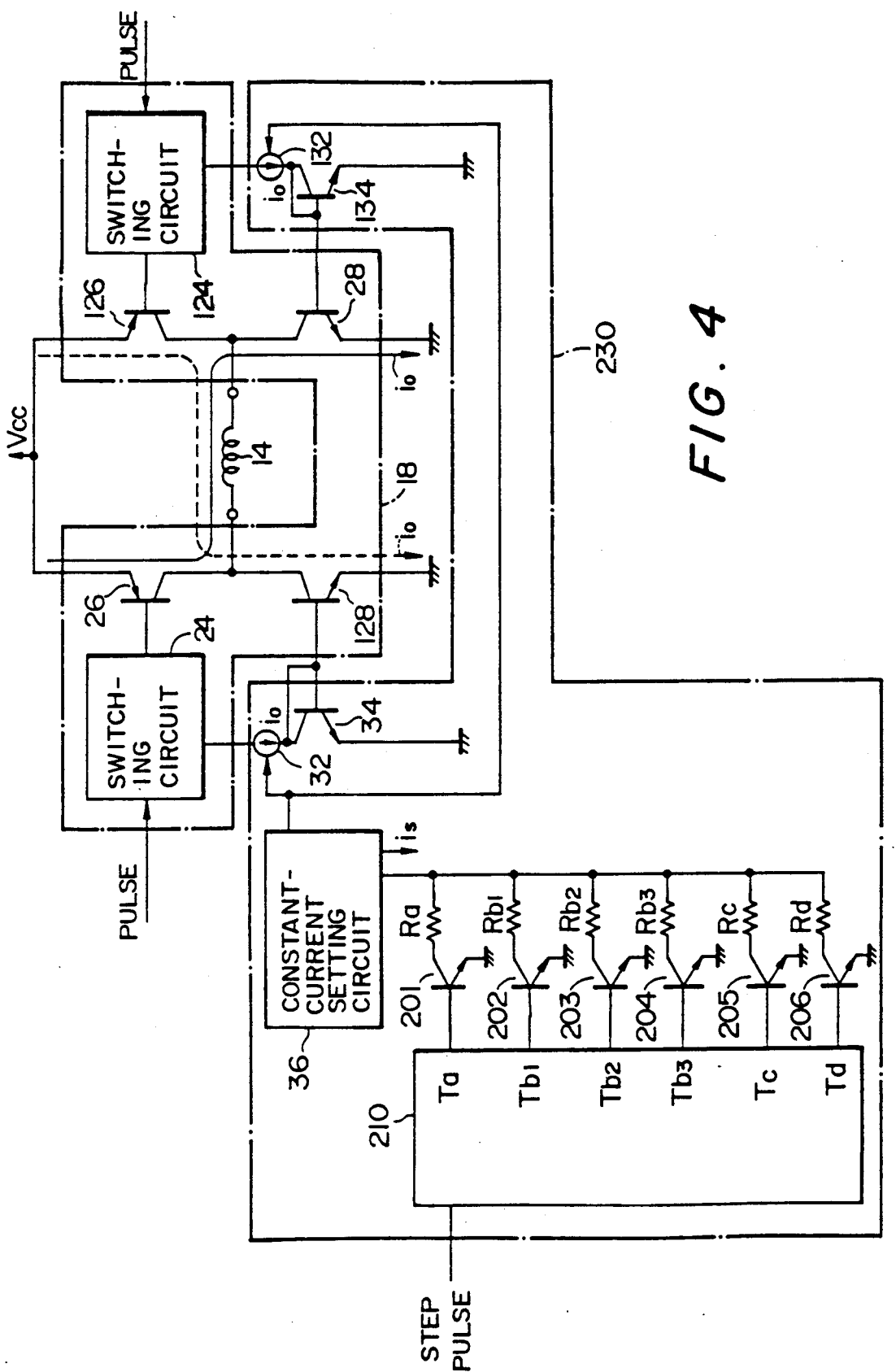
FIG. 4 shows a second embodiment of a drive circuit for a stepping motor according to the present invention, wherein the constant current is switched in accordance with the stage of step seeking of the head.

FIG. 4 shows a second embodiment of the present invention. The same numerals are provided for the elements which are the same as those in the first embodiment shown in FIG. 2, and explanation thereof will be omitted.

The second embodiment is characterized in that a constant-current circuit 230 sets different constant current values in accordance with the stage of step seeking. For this purpose, the fixed resistance $R_S$ attached to the constant-current setting circuit 36 is varied in accordance with the state of step seeking.

In this embodiment, different resistances are represented by a plurality of resistances $Ra$, $Rb_1$, $Rb_2$, $Rb_3$, $Rc$ and $Rd$ having different values selected in advance. The resistance $Ra$ determines the starting current applied when a seek command is supplied to the stepping motor and the resistances $Rb_1$ to $Rb_3$ respectively determine the currents necessary at the time of seeking after starting with respect to different stepping rates of step pulses, as will be described later in detail. The resistance $Rc$ determines the current applied at the time of settling for positioning the read/write head at a predetermined track, and the resistance $Rd$ determines hold current applied at the time of reading/writing.

To select a resistance from these resistances, transistors 201 to 206 are connected to the respective resistances, and a base current is supplied from a control circuit 210 to the base of each transistor, so that only the selected transistor is turned on and the resistance connected to the selected transistor determines the current value of the constant-current setting circuit 36.

To the control circuit 210, a step pulse is supplied and a signal for selectively switching each transistor is output from the control circuit 210.

FIG. 5 shows an example of a change in the average driving current due to a change in the constant current at the time of application of a step pulse and the movement of the head.

In FIG. 5, the step pulse is composed of a train of seven pulses having the standard pulse rate, which is set at 4 to 5 ms.

The step pulse is shown in FIG. 5(A), and the average current is selected in accordance with the movement of the head in this embodiment, as shown in FIG. 5(B). The selection of the average current is determined by the selection of a resistance from the resistances $Ra$ to $Rd$ in FIG. 4.

Actually, the head moves a predetermined time behind the application of a step pulse, as well known. FIG. 5(C) shows an example of the movement of the head, wherein the abscissa represents the elapse of time and the ordinate the position of the track. On the assumption that the head is situated at the track 0 at the initial value, the state in which the head moves to the track 7 in accordance with the seven pulses each of which supplies a positional command to the stepping motor is shown. The positional command is indicated by the steplike line.

As is clear from FIG. 5(B), the movement of the head is divided into five stages. At the starting stage Ta during the period between the application of a pulse and the start of the stepping motor, a comparatively large current is applied, and the starting current is generated by the resistance $Ra$ shown in FIG. 4.

In this embodiment, the starting stage is defined by a predetermined time Ta elapsed from the application of the first pulse.

Therefore, the starting time Ta takes a constant value irrespective of the variation of the stepping rate, but the starting time may naturally be changed as desired in the present invention.

When the initial start of the motor is finished, the process moves to the actual seeking operation. At the seeking stage represented by the symbol $Tb_1$ in FIG. 5(B), the average current is preferably set at the minimum current necessary for seeking the head, thereby enabling great reduction in the current consumed.

In this embodiment, the current applied at the seeking stage $Tb_1$ is determined by the resistance $Rb_1$ shown in FIG. 4, and the current at the seeking stage varies in accordance with the stepping rate.

In FIG. 5(B), when the stepping rate is high, since the head is sought at a high speed, the average current is set at a high value as indicated by the broken line, while when the stepping rate is low, the average current is set at a low value as indicated by the chain line.

By the time when the seeking operation is finished in FIG. 5(B), the head has been moved to the track 7 in accordance with the command, as shown in FIG. 5(C). The movement is carried out a predetermined time behind the application of the step pulse 7, but the head itself reaches the correct track position with the delay.

Since the head itself is moved with an overshoot, as shown in FIG. 5(C), the settling stage is set as the third stage in order to determine the actual position with accuracy. At the settling stage Tc, a comparatively large current is supplied again in the same way as at the time of starting, the current value at this time being determined by the resistance Rc shown in FIG. 4.

In this embodiment, the current applied at the time of settling is set at a constant value irrespective of the stepping rate, whereby the head is positioned at the correct position with an overshoot.

When the position of the head is determined at the settling stage Tc, the process proceeds to the holding stage Td as the fourth stage in order to hold the position of the head. At this stage at which the correct position of the head is only held, a small average current is supplied to the stepping motor. The average current at this time is determined by the resistance Rd shown in FIG. 4.

At the holding stage Td, the head carries out the reading or writing operation.

In FIG. 5(B), when the holding operation is finished, the process proceeds to the standby stage Te at which the supply of the current to the stepping motor is stopped.

As described above, it will be understood that according to this embodiment, different average currents are selected in the respective stages of the rotation of the stepping motor, and that the selection of the average current is carried out by the switching of the resistances which are connected to the constant-current setting circuit 36.

At the time of seeking $Tb_1$, the average current is set at a different value on the basis of the difference in the stepping rate by changing over the resistance to any of the resistances $Rb_1$, $Rb_2$ and $Rb_3$, as shown in FIG. 5(B).

Figure 6:
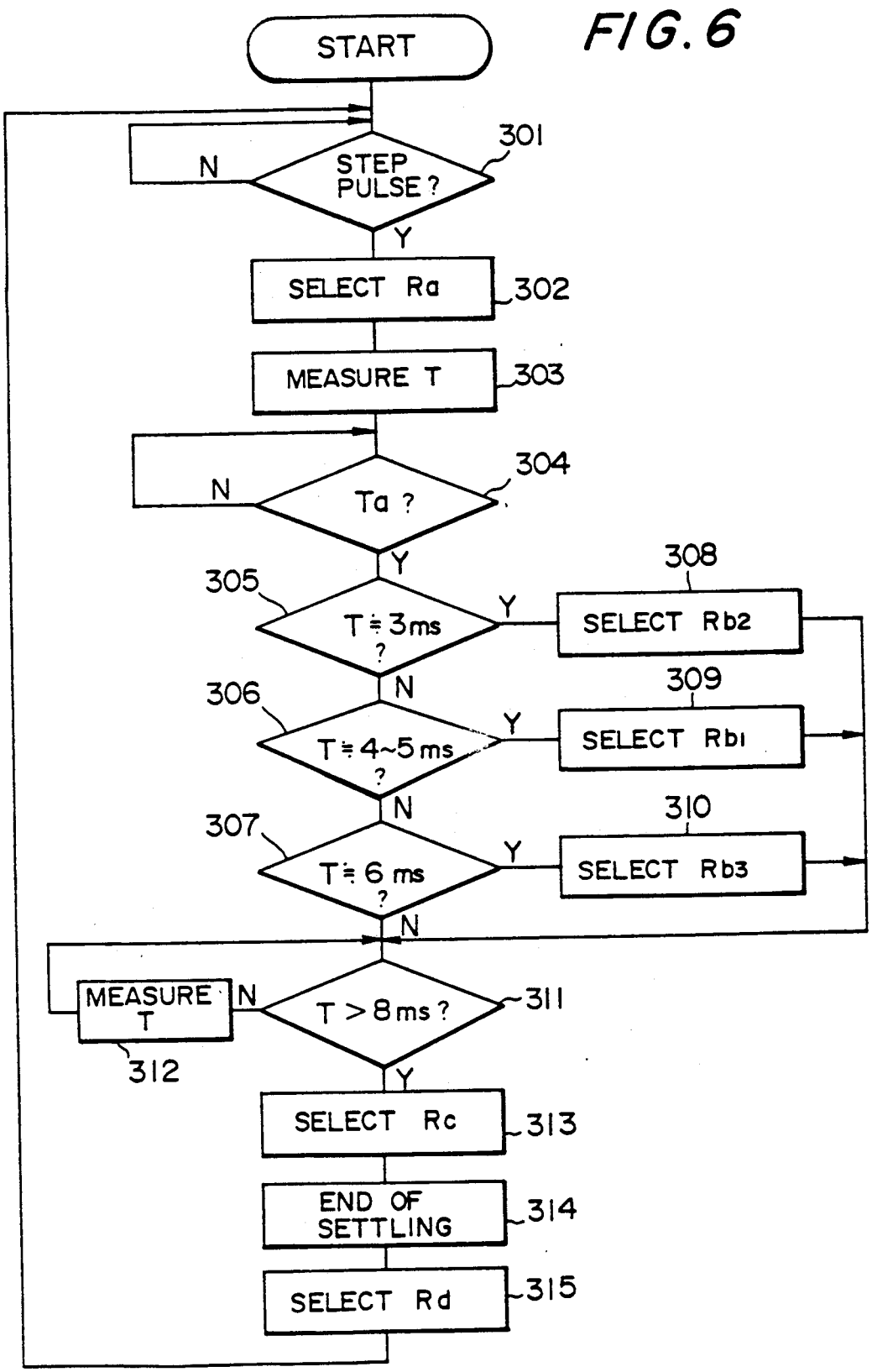
FIG. 6 is a flowchart of the control of the control circuit in the second embodiment.

FIG. 6 shows the operation of the control circuit 210 for switching the resistances so as to switch the average currents shown in FIG. 5(B) in the following manner.

At the step 301, the supply of a step pulse is waited for, and when a step pulse is applied, the base current is supplied from the control circuit 210 to a transistor 201 at the step 302, whereby the fixed resistance Ra is selected as the resistance of the constant-current setting circuit 36.

In this way, a comparatively large starting current is obtained at the time of the start of the stepping motor, as described above.

At the same time with the selection of the resistance Ra at the time of starting, the stepping rate T is measured at the step 303, and the measured stepping rate T is stored.

The supply of the starting current is continued for the predetermined time Ta from the application of the first step pulse, and the duration is monitored at the step 304.

Therefore, the supply of the comparatively large current at the time of starting is continued for predetermined time Ta irrespective of the stepping rate, and for example, when the stepping rate is standard or high, two step pulses are supplied during the starting period, while when the stepping rate is low, one step pulse is counted.

When the starting stage Ta is finished, judgement is made as to whether the stepping rate T measured at the step 303 is high, standard or low at the steps 305, 306 and 307, respectively.

In this embodiment, the standard stepping rate is about 4 to 5 ms, as described above, and the low stepping rate is set at about 6 ms, while the high stepping rate is set at about 3 ms.

Therefore, when the stepping rate T equals to about 3 ms, the process proceeds from the step 305 to the step 308 at which the base current is supplied from the control circuit 210 to a transistor 203 so as to select the resistance $Rb_2$ for obtaining a comparatively large current value in accordance with the high stepping rate. By switching the resistances, it is possible to cause the average current at the time of seeking to have a predetermined amount lower value than the average current at the time of starting.

When the stepping rate T is standard, the process proceeds from the step 306 to the step 309 at which the base current is supplied from the control circuit 210 to a transistor 202 so as to select the resistance Rb1, as shown in FIG. 5.

When the stepping rate T is low, the process proceeds from the step 307 to the step 310 at which the base current is supplied from the control circuit 210 to a transistor 204 so as to select the resistance $Rb_3$.

In this way, the resistance is selected and the constant current is set at the time of seeking, and the selected constant current is supplied to the stepping motor until all the step pulses have been supplied.

At the step 311, whether or not the stepping rate T exceeds a predetermined value, 8 ms in this embodiment, is judged. Since the ordinary stepping rate is not more than 8 ms, when the stepping rate T exceeds 8 ms, the application of step pulses is judged to have been finished.

At the step 312, the stepping rate T is measured for the step 311.

When the supply of step pulses is completed, the base current is supplied from the control circuit 210 to a transistor 205 so as to select the resistance Rc at the time of settling Tc at the step 313, thereby setting the settling current.

The settling time Tc is set at a predetermined value, and at the step 314, the duration is measured so as to detect the completion of the settling.

When the settling operation is finished, the holding current necessary for the subsequent holding stage Td is selected by supplying the base current from the control circuit 210 to a transistor 206 so as to select the resistance Rd at the step 315.

At the step 315, application of the hold current is continued for a predetermined time.

As described above, the current value of the constant-current circuit is selected in accordance with each stage of step seeking. Since the current supplied to the stepping motor is held at a constant value without generating nonuniformity at any stage, it is possible to greatly reduce the error in the positioning of the stepping motor.

Thus, according to the present invention, it is possible to improve the accuracy of the stepping angle by preventing the generation of an error in the stepping angle due to nonuniformity in the exciting currents by so controlling the exciting currents as to have the same value.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A drive circuit for a stepping motor comprising:
   a plurality of coils for providing exciting magnetic fields to said stepping motor;
   a drive control circuit for so controlling the rotation of a rotor as to have a predetermined stepping angle by supplying exciting currents to said exciting coils; and
   a constant-current circuit for so controlling said exciting currents supplied to the respective exciting coils as to have the same value, said constant-current circuit comprising:
   a first current mirror circuit comprising:
      a first transistor a base of which is connected to a base of a second transistor for exciting a forward current; and
      a first constant-current source for supplying a predetermined constant current to the first transistor; and
   a second current mirror circuit comprising:
      a third transistor a base of which is connected to a base of a fourth transistor for exciting a reverse current;
      a second constant-current source for supplying a predetermined constant current to the third transistor; and
   a constant-current setting circuit for setting the output currents of said first and second constant current sources; and
   an externally attached resistance connected to said constant-current setting circuit, a value of said output currents of said first and second constant current sources being adjusted in accordance with the value of said externally attached resistance; and
   a means for varying the resistance of said externally attached resistance;
   whereby said exciting current flowing in said respective exciting coils are set at the same value, thereby improving the accuracy of said stepping angle.

2. A drive circuit for a stepping motor according to claim 1, wherein the value of said externally attached resistance is varied to a different value in accordance with the lapse, of time of motor seeking.

3. A drive circuit for a stepping motor according to claim 2, wherein said externally attached resistance is divided into a resistance at the time of starting, a resistance at the time of settling and a resistance at the time of holding.

4. A drive circuit for a stepping motor according to claim 3, wherein said resistance at the time of starting is selected for a predetermined time in succession from the application of a first step pulse.

5. A drive circuit for a stepping motor according to claim 3, wherein said resistance selected at the time of seeking is set at a different value in accordance with the stepping, rate.

6. A drive circuit for a stepping motor according to claim 1, wherein
   a plurality of kinds of resistances are adopted as said externally attached resistance which is connected to said constant-current setting circuit; and
   said constant-current circuit is provided with a control circuit for switching said resistances by the application of a step pulse.

* * * * *